(12) United States Patent
Kaye et al.

(10) Patent No.: US 10,769,877 B2
(45) Date of Patent: Sep. 8, 2020

(54) SECURE HANDSFREE PROXIMITY-BASED ACCESS CONTROL

(71) Applicant: OpenPath Security Inc., Culver City, CA (US)

(72) Inventors: Cameron Kaye, Van Nuys, CA (US); Samy Kamkar, Los Angeles, CA (US); Alexander A. Kazerani, Santa Monica, CA (US)

(73) Assignee: OPENPATH SECURITY INC., Culver City, CA (US)

( * ) Notice: Subject to any disclaimer, the term of this patent is extended or adjusted under 35 U.S.C. 154(b) by 0 days.

(21) Appl. No.: 16/416,429

(22) Filed: May 20, 2019

(65) Prior Publication Data

US 2019/0272690 A1    Sep. 5, 2019

Related U.S. Application Data

(63) Continuation-in-part of application No. 16/380,855, filed on Apr. 10, 2019, which is a continuation of
(Continued)

(51) Int. Cl.
*G07C 9/00* (2020.01)
*G07C 9/28* (2020.01)
(Continued)

(52) U.S. Cl.
CPC ........... *G07C 9/28* (2020.01); *G07C 9/00309* (2013.01); *G07C 9/00571* (2013.01); *H04W 4/80* (2018.02);
(Continued)

(58) Field of Classification Search
CPC .. G07C 9/28; G07C 9/00309; G07C 9/00571; G07C 2009/00769; H04W 4/80; H04W 48/18; H04W 64/00; H04W 88/06; H04W 84/12; H04W 12/00; H04W 48/02; H04W 24/08; H04W 48/16; H04W 76/02;
(Continued)

(56) References Cited

U.S. PATENT DOCUMENTS

| 4,804,945 A | 2/1989 | Millet |
| 9,767,630 B1 | 9/2017 | Kazerani et al. |

(Continued)

*Primary Examiner* — An T Nguyen
(74) *Attorney, Agent, or Firm* — Ansari Katiraei LLP; Arman Katiraei; Sadiq Ansari

(57) ABSTRACT

Secure handsfree proximity-based access control is provided by a system that includes one or more system devices located near different secured resources. Each system device may broadcast a changing unique identifier to user devices in wireless range of the system device. The system may also include an application that runs on each user device, and that obtains a signal strength measurement in response to receiving or detecting a current identifier advertised from a system device. The application may request access to a secured resource over one or more available wireless networks in response to satisfying the signal strength threshold. The system may include an access control unit that authorizes access to the secured resource based on the earliest arriving request, and further based on an identifier of the request matching to the current identifier, and the current identifier not having been previously used to obtain access to the secured resource.

20 Claims, 10 Drawing Sheets

Related U.S. Application Data application No. 15/707,764, filed on Sep. 18, 2017, now Pat. No. 10,304,269, which is a continuation of application No. 15/448,105, filed on Mar. 2, 2017, now Pat. No. 9,767,630.

(51) Int. Cl.

| | | |
|---|---|---|
| *H04W 4/80* | (2018.01) | |
| *H04W 48/18* | (2009.01) | |
| *H04W 64/00* | (2009.01) | |
| *H04W 88/06* | (2009.01) | |
| *H04W 84/12* | (2009.01) | |

(52) U.S. Cl.
CPC ........... *H04W 48/18* (2013.01); *H04W 64/00* (2013.01); *G07C 2009/00769* (2013.01); *H04W 84/12* (2013.01); *H04W 88/06* (2013.01)

(58) Field of Classification Search
CPC ..... H04W 4/008; H04W 8/005; H04W 12/08; H04L 9/30; G06Q 20/40; G06Q 20/3278
See application file for complete search history.

(56) References Cited

U.S. PATENT DOCUMENTS

| | | | | |
|---|---|---|---|---|
| 9,961,531 | B2* | 5/2018 | Choi | H04W 8/005 |
| 10,129,272 | B2* | 11/2018 | Lee | H04L 63/1416 |
| 10,231,128 | B1* | 3/2019 | Ziraknejad | H04L 9/0825 |
| 10,403,072 | B2* | 9/2019 | Earles | G06F 21/35 |
| 2002/0014954 | A1 | 2/2002 | Fitzgibbon et al. | |
| 2004/0036573 | A1 | 2/2004 | Fitzgibbon et al. | |
| 2008/0017705 | A1 | 1/2008 | Costello et al. | |
| 2010/0313241 | A1* | 12/2010 | Lee | H04W 12/06 726/3 |
| 2012/0280790 | A1 | 11/2012 | Gerhardt et al. | |
| 2013/0176107 | A1* | 7/2013 | Dumas | G07C 9/00571 340/5.61 |
| 2014/0077929 | A1 | 3/2014 | Dumas et al. | |
| 2014/0125453 | A1 | 5/2014 | McIntyre et al. | |
| 2014/0188348 | A1 | 7/2014 | Gautama et al. | |
| 2014/0199967 | A1* | 7/2014 | Varoglu | H04W 12/0804 455/411 |
| 2014/0235167 | A1* | 8/2014 | Jung | H04W 76/10 455/41.2 |
| 2014/0292481 | A1* | 10/2014 | Dumas | G07C 9/00174 340/5.61 |
| 2014/0340196 | A1 | 11/2014 | Myers et al. | |
| 2015/0170132 | A1* | 6/2015 | Patel | G06Q 20/3226 705/44 |
| 2016/0055692 | A1* | 2/2016 | Trani | G07C 9/20 340/5.61 |
| 2016/0098874 | A1* | 4/2016 | Handville | G07C 9/00658 340/5.61 |
| 2016/0128114 | A1* | 5/2016 | Moy | H04W 12/06 455/434 |
| 2016/0321517 | A1 | 11/2016 | Gandolph et al. | |
| 2016/0343185 | A1 | 11/2016 | Dumas | |
| 2017/0013153 | A1* | 1/2017 | Shin | H04W 52/0245 |
| 2018/0338330 | A1* | 11/2018 | Ledvina | H04W 4/80 |
| 2019/0073468 | A1 | 3/2019 | Kazerani et al. | |
| 2019/0073846 | A1 | 3/2019 | Kamkar et al. | |
| 2019/0102961 | A1* | 4/2019 | Earles | G06F 21/35 |
| 2019/0182740 | A1* | 6/2019 | Gao | H04W 36/18 |
| 2019/0236600 | A1* | 8/2019 | Glendenning | H04W 4/80 |
| 2019/0272690 | A1* | 9/2019 | Kaye | H04W 48/02 |
| 2019/0295344 | A1* | 9/2019 | Bodell | G07C 9/00309 |
| 2019/0332787 | A1* | 10/2019 | Graf | G06F 16/95 |

\* cited by examiner

SECURE HANDSFREE PROXIMITY-BASED ACCESS CONTROL

CLAIM OF BENEFIT TO RELATED APPLICATIONS

This application is a continuation-in-part of U.S. non-provisional application Ser. No. 16/380,855, entitled "Multi-Network Entry Access Systems and Methods", filed Apr. 10, 2019 which is a continuation of U.S. non-provisional application Ser. No. 15/707,764, entitled "Multi-Network Entry Access Systems and Methods", filed Sep. 18, 2017, now U.S. Pat. No. 10,304,269, which is a continuation of U.S. non-provisional application Ser. No. 15/448,105, entitled "Multi-Network Entry Access Systems and Methods", filed Mar. 2, 2017, now U.S. Pat. No. 9,767,630. The contents of application Ser. Nos. 16/380,855, 15/707,764, and 15/448, 105 are hereby incorporated by reference.

BACKGROUND ART

Access control may have competing security objectives and convenience objectives. The security objectives may include ensuring that only authorized personnel are granted access to a secured resource, and that the access control procedure is not easily circumvented. The convenience objectives may include reducing the time, effort, and actions taken by an individual to complete the access control procedure. The convenience is reduced with each additional amount of time a user spends waiting for access, and with each additional action that the user has to perform to gain access.

Smartcards and proximity cards provide more security and convenience than physical keys, but still require the user to carry one additional item (e.g., the smartcard or proximity card) and still require the individual to retrieve and place the smartcard or proximity card in front of a reader before access can be granted. While harder to replicate than physical keys, smartcards and proximity can also compromise security, because they can be used by anyone when misplaced, and can be replicated with the right equipment.

Smartphones are ubiquitous, and can be more secure than smartcards and proximity cards due to biometric authentication, passwords, personal identification numbers ("PINs"), or other authentication that may be required before the smartphone can be used for access control or other purposes. However, the convenience of using a smartphone for access control is compromised when having to physically remove a smartphone from a purse or pocket, securely unlock the device via the biometric authentication, password, PIN, or other authentication, perform one or more interactions to initiate an unlock procedure, and wait some amount of time for wireless authorization to complete.

DETAILED DESCRIPTION

The following detailed description refers to the accompanying drawings. The same reference numbers in different drawings may identify the same or similar elements.

Systems and methods, as provided herein, provide secure handsfree proximity-based access control for securely accessing a secured resource using a user device that can remain in the pocket or purse of the user seeking access to the secured resource. The secure handsfree proximity-based access control may be initiated by a system device, and may be securely completed with the user device with as much as a single user interaction with the system device. In other words, the user need not interact with his/her user device in any manner to initiate or complete the secure authorization, or to gain access to the secured resource.

In some embodiments, the user interaction with the system device may cause the system device to wirelessly broadcast a trigger to user devices that are in wireless range of the system device. The trigger may cause a user device, that receives the trigger and that is within a specified proximity to the system device, to automatically authorize access to a secured resource that is adjacent to the system device over one or more wireless networks without the user accessing or otherwise interactive with the user device.

Figure 1:
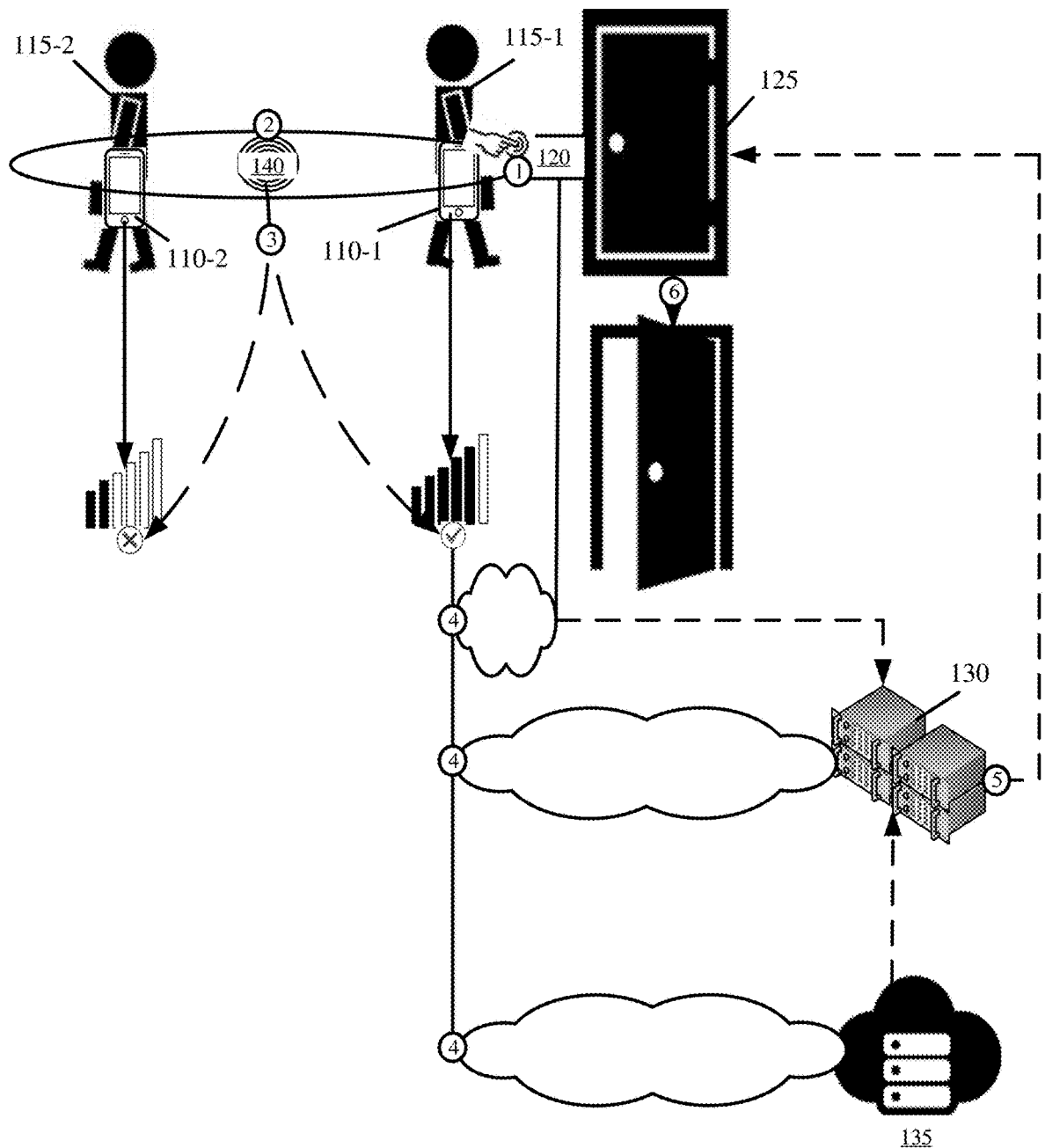
FIG. 1 illustrates an example of the secure handsfree proximity-based access control in accordance with some embodiments described herein.

FIG. 1 illustrates an example of the secure handsfree proximity-based access control in accordance with some embodiments described herein. FIG. 1 includes user devices 110-1 and 110-2 (herein sometimes collectively referred to as "user devices 110" or individually as "user device 110") carried by users 115-1 and 115-2 (herein sometimes collectively referred to as "users 115" or individually as "users 115") respectively. User devices 110 may be used to securely communicate with one or more of system device 120, access control unit ("ACU") 130, and/or cloud-based controller 135 of an access control system in order to authorize access to secured resource 125 that is located adjacent to system device 120, and that is controlled by the access control system.

As shown FIG. 1, first user 115-1 is next to system device 120. First user 115-1 may initiate the secure handsfree proximity-based access control procedure by directly interacting (at 1) with system device 120. For instance, first user 115-1 may touch, perform a gesture, speak a command, or provide other physical input that is detected by one or more sensors of system device 120. At this time, first user device 110-1 and second user device 110-2 may not be connected to system device 120.

In response to first user 115-1 interacting (at 1) with system device 120, system device 120 may broadcast (at 2) identifier 140. System device 120 may broadcast (at 2) identifier 140 over a first wireless network, using signaling of a first wireless network technology, or from a first wireless network radio of system device 120. System device 120 may create the first wireless network. The first wireless network may be a short-range wireless network. For instance, system device 120 may broadcast (at 2) identifier 140 using a Bluetooth or Bluetooth Low Energy ("BLE") radio. In some embodiments, system device 120 may use other wireless network technologies (e.g., WiFi) to broadcast identifier 140 a short distance from system device 120 (e.g., less than 20 feet).

In FIG. 1, first user device 110-1 and second user device 110-2 may be in range of the first wireless network, or may be in range of the wireless signaling and/or advertisements transmitted from system device 120. Accordingly, first user device 110-1 and second user device 110-2 may both receive identifier 140 from system device 120 even without having an established network connection to system device 120. Identifier 140 may be registered to an access control application that is installed on each user device 110. The operating system of each user device 110 may pass identifier 140 to the access control application based on the registration.

Identifier 140 may include a value that identifies system device 120 and/or secured resource 125. Identifier 140 may, additionally or alternatively, include a value that identifies the first wireless network, and/or a value (e.g., network name) that user devices 110 may use to establish a connection and communicate with system device 120. In some embodiments, the value of identifier 140 may be encoded with a base64 or other encoding scheme so that the value includes different informational components from which to identify secured resource 125 as a nearest accessible resource, the first wireless network, and/or information for the secure handsfree proximity-based access control. In any case, identifier 140 may initiate the secure handsfree proximity-based access control procedure on each receiving user device 110. Specifically, identifier 140 may wake or trigger the access control application to commence the secure handsfree proximity-based access control procedure.

Commencement of the secure handsfree proximity-based access control procedure may include each user device 110, via execution of the corresponding access control application, detecting (at 3) proximity to system device 120. In some embodiments, user devices 110 may detect (at 3) proximity to system device 120 based on signal strength. For instance, user devices 110 may measure signal strength of the first wireless network from their current positions, may measure strength of the signaling coming from system device 120, and/or may measure signal strength based on receipt of identifier 140. In some embodiments, user devices 110 may, additionally or alternatively, detect (at 3) proximity to system device 120 using time-of-flight, angle-of-incidence, geolocation, and/or other techniques. In some embodiments, user devices 110 may, additionally or alternatively, detect (at 3) proximity to system device 120 based on sound or light that is emitted from system device 120 and/or other signaling that can be detected by user devices 110 using one or more sensors of user devices 110.

Second user device 110-2 may determine that the signal strength measurement taken by second user device 110-2 does not satisfy a configured signal strength threshold. The signal strength threshold may define a proximity between a user device 110 and system device 120 before the user device 110 can request access to secured resource 125 using identifier 140. Second user device 110-2 does not continue with the secure handsfree proximity-based access control procedure based on the signal strength measurement failing to satisfy the signal strength threshold.

First user device 110-1 may determine that the signal strength measurement taken by first user device 110-1 does satisfy the threshold value. Consequently, first user device 110-1 may continue the secure handsfree proximity-based access control procedure, and may request access to secured resource 125 using identifier 140.

To do so, first user device 110-1 may transmit (at 4) access control messaging over the first wireless network to system device 120, over a second wireless network to ACU 130, and over a third wireless network to cloud-based controller 135. The messaging may be transmitted contemporaneously or in parallel, and may include identifier 140, that directly or indirectly identifies system device 120 and/or secured resource 125, in addition to access credentials, authorization tokens, and/or other data by which user 115-1 or user device 110-1 is authorized for access by the access control system. The access control messaging may include one or more data packets for transmission across a packet-switched data network. For instance, the access control messaging may include HyperText Transfer Protocol ("HTTP") messages that are sent via Internet Protocol ("IP") packets.

Each of the first, second, and third wireless networks may be different wireless networks. For instance, the first wireless network may be a Bluetooth or other short-range wireless network for communicating with system device 120, the second wireless network may be a WiFi or other medium-range wireless network for communicating with ACU 130, and the third wireless network may be a Long-Term Evolution ("LTE"), Fifth Generation ("5G"), or other long-range wireless network. Each wireless network may provide different performance (e.g., latency, jitter, etc.), and may require different network connections to be established prior to or as part of exchanging the access control messaging.

The access control messaging over the different wireless networks may be routed to ACU 130. ACU 130 may make an authorization decision as to whether first user 110-1 is permitted to access secured resource 125 based on whichever of the access control messaging sent over the three different wireless networks arrives first at ACU 130. ACU 130 may determine (at 5) that first user 115-1 or first user device 110-1 is authorized to access secured resource 125 based the first arriving access control messaging. For example, ACU 130 may receive the access control messaging that was transmitted over the first wireless network before receiving the access control messaging that was transmitted over the second or third wireless networks. In this example, ACU 130 may determine (at 5) that first user 115-1 or first user device 110-1 is authorized to access secured resource 125 based on the access control messaging that was transmitted over the first wireless network, and may ignore or discard the access control messaging that was transmitted over the second and third wireless networks when the later arriving access control messaging contains identifier 140 that was also included in the earliest arriving access control messaging used to authorize access to secured resource 125. More specifically, ACU 130 may receive the earliest arriving access control messaging, may extract identifier 140 from the messaging to determine that the messaging is a request to access secured resource 125, may extract one or more credentials, tokens, and/or authorization information from the messaging, and may perform a lookup of the credentials, tokens, and/or authorization information against access privileges that are defined for secured resource 125 in order to determine that user 115-1 or first user device 110-1 is authorized to access secured resource 125. In some embodiments, ACU 130 may decode identifier 140 to extract a value identifying secured resource 125 and/or system device 120 associated with secured resource 125.

In response to authorizing (at 5) access, ACU 130 may send messaging that provides (at 6) access to secured resource 125. ACU 130 may provide an unlock message directly to secured resource 125 when secured resource 125 has an electronic lock or other access control mechanism that can be accessed remotely. Alternatively, ACU 130 may provide the unlock message to system device 120, and system device 120 may grant access to secured resource 125 in response to the unlock message from ACU 130.

Since the access control procedure is triggered by the system device broadcasts (e.g., triggers that are broadcast from the system device), multiple user devices 110, that are in range of the broadcasts and that measure signal strengths to be within the signal strength threshold, may contemporaneously request access to secured resource 125 from ACU 130 over different networks. In other words, ACU 130 may receive multiple requests for access to secured resource 125 at or near the same time from one or more user devices 110 over different networks. In these cases, ACU 130 operates to grant access in response to the first arriving request from authorized user 115 or authorized user device 110. ACU 130 may ignore, discard, or otherwise not take action on later arriving requests or requests from unauthorized users or user devices 110. In some embodiments, ACU 130 may log the access requests from the different user devices 110 for tracking purposes while providing access in response to the earliest arriving request.

Figure 2:
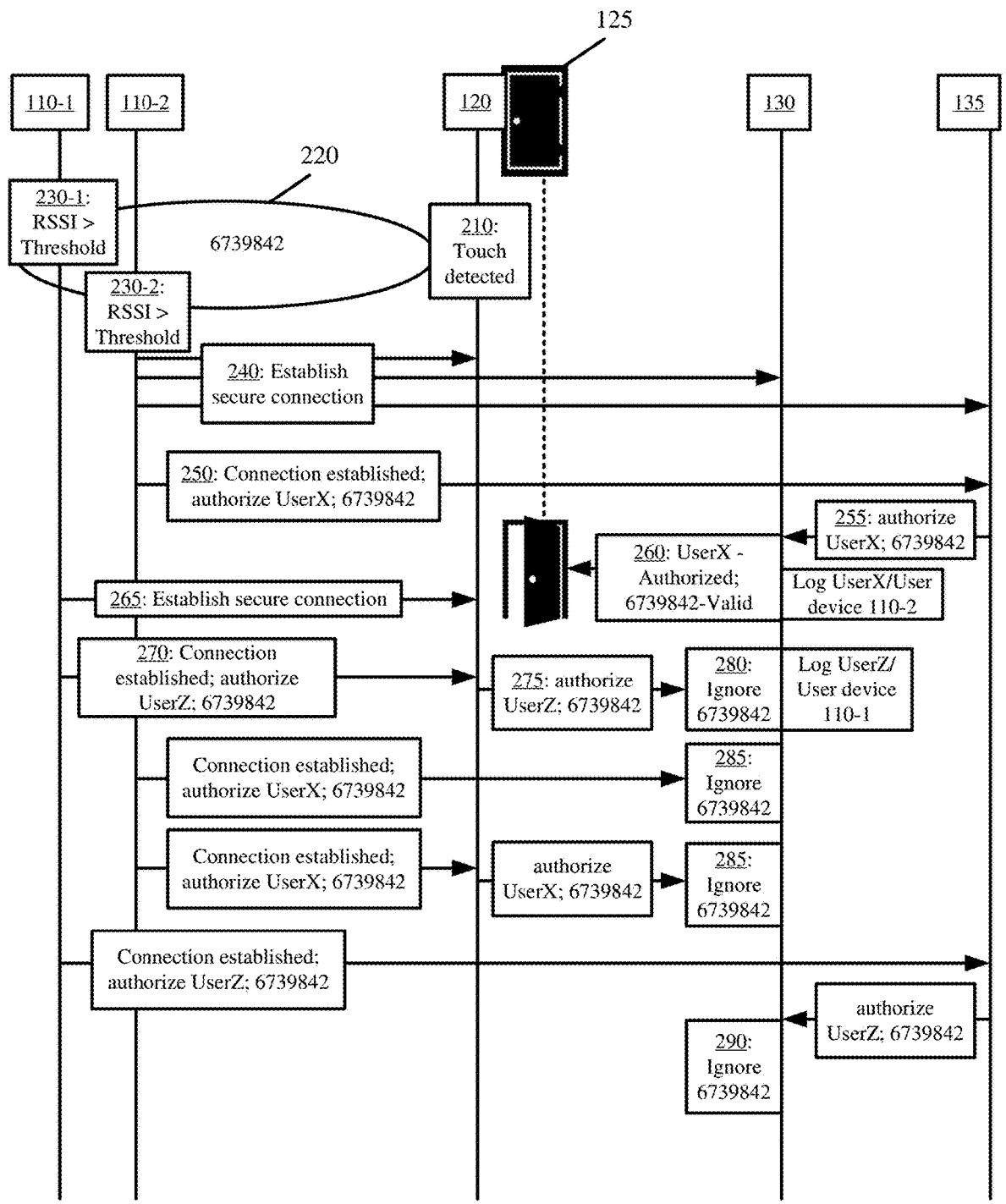
FIG. 2 illustrates an example of using the secure handsfree proximity-based access control to provide access in response to a first arriving request while discarding duplicate and later arriving requests for access to the same secured resource in accordance with some embodiments described herein.

FIG. 2 illustrates an example of using the secure handsfree proximity-based access control to provide access in response to a first arriving request while discarding duplicate and later arriving requests for access to the same secured resource in accordance with some embodiments described herein. As in FIG. 1, the secure handsfree proximity-based access control may commence in response to system device 120 detecting (at 210) a touch or other user interaction with system device 120.

In response to detecting (at 210) the touch, system device 120 may generate a randomized and unique request identifier (e.g., "6739842"), and may advertise (at 220) the request identifier over a first wireless network, using signaling of a first wireless network technology, or from a first wireless network radio of system device 120. System device 120 may advertise (at 220) the request identifier to any user devices 110 that are in range of the first wireless network or of signaling emitted from system device 120. User devices 110-1 and 110-2 are illustrated in FIG. 2 to be in range of the first wireless network, and receive the request identifier transmitted by system device 120 even without having established connections with system device 120 or having previously communicated with system device 120. In some embodiments, the request identifier, or a portion of the request identifier, may correspond to a changing advertised name of system device 120 that user device 110 may use to connect to and/or communicate with system device 120. In some embodiments, the request identifier, or a portion of the request identifier, may map to or may identify secured resource 125.

In response to receiving the request identifier, each user device 110-1 and 110-2 may obtain a signal strength measurement (e.g., Received Signal Strength Indicator ("RSSI")) of or from the first wireless network created by system device 120. As noted above, other signal measures (e.g., time-of-flight) may be used to detect proximity of user devices 110 to system device 120.

In FIG. 2, each user device 110-1 and 110-2 may determine (at 230-1 and 230-2) that the measured signal strength for the first wireless network satisfies the signal strength threshold. In some embodiments, satisfying the signal strength threshold may indicate that each user device 110-1 and 110-2 is within a threshold distance of or desired proximity to system device 120.

Satisfying the signal strength threshold may cause each user device 110-1 and 110-2 to perform an authorization procedure in order to request access to secured resource 125 that is directly or indirectly identified in the request identifier. The authorization procedure may be simultaneously or contemporaneously performed over different wireless networks for performance reasons. For instance, the authorization procedure may be simultaneously or contemporaneously performed over the different wireless networks to complete the authorization procedure over whichever of the wireless networks is fastest. For security purposes, the authorization procedure may include establishing a secure connection with an authorization endpoint over each of the one or more wireless networks before exchanging the authorization messaging.

As shown in FIG. 2, user device 110-2 may simultaneously or contemporaneously establish (at 240) a first secure connection over the first wireless network (e.g., a Bluetooth network) with system device 120, a second secure connection over a second wireless network (e.g., a WiFi network) with ACU 130, and a third secure connection over a third wireless network (e.g., an LTE or 5G network) with cloud-based controller 135. In some embodiments, user device 110-2 may establish (at 240) two or more secure connections with different authorization endpoints over the same wireless network. For instance, user device 110-2 may establish (at 240) the second and third secure connections with the ACU 130 and cloud-based controller 135 respectively using the same LTE network. In some embodiments, the access control application running on each user device 110 may be configured with domain names, IP addresses, or other identifiers of ACU 130 and cloud-based controller 135, and user devices 110 may connect to system device 120 using the request identifier when the request identifier provides an identifier for connecting to the first wireless network or a name for connecting to system device 120.

In some embodiments, establishing (at 240) a secure connection may include performing a handshake procedure to configure encryption parameters with which the endpoints of the secure connection encrypt and decrypt packets transferred over the secure connection. In some embodiments, each secure connection may be established using the Transport Layer Security ("TLS") protocol or other network protocol for secure communications. As shown in FIG. 2, user device 110-2 may begin establishing the one or more secure connections before user device 110-1 due to faster execution, more available resources, and/or other factors affecting performance of user devices 110.

User device 110-2 may first establish the third secure connection with cloud-based controller 135 (e.g., due to lower latency and/or lower overhead in establishing the secure connection over the third wireless network than the other wireless networks), and may commence the authorization procedure with cloud-based controller 135 by transmitting (at 250) access control messaging to cloud-based controller 135. The access control messaging may include the request identifier, that is received from system device 120 and that may directly or indirectly identify a request to access secured resource 125, and/or various credentials, tokens, and/or information with which to determine whether user device 110-2 or associated user 115-2 is permitted to access secured resource 125. Cloud-based controller 135 may perform a local authorization of user device 110-2, or may forward (at 255) the access control messaging to ACU 130.

In response to receiving the access control messaging, that originated over the third network and that is forwarded from cloud-based controller 135, ACU 130 may determine whether the access control messaging includes a valid request identifier. In some embodiments, system device 120 may provide ACU 130 with each newly generated request identifier over a back-haul network connection to ACU 130, and ACU 130 may track the valid request identifiers of one or more system devices 120 and/or secured resources 125 associated with each system device 120. In some other embodiments, system device 120 and ACU 130 may be configured with the same request identifier generation routine (e.g., randomized value generators that have synchronized clocks and that are seeded with the same seed value).

In FIG. 2, ACU 130 may determine that the access control messaging for requesting access to secure resource 125 does include a valid request identifier generated by system device 120. This determination may include matching the request identifier, that is included with the access control messaging, to the request identifier that ACU 130 receives from system device 120 or that ACU 130 generates using the request identifier generation routine that is linked to the request identifier generation routine used by system device 120.

ACU 130 may also determine whether access to secured resource 125 was previously provided based on a request with the same request identifier. ACU 130 determines that access has not yet been granted to secured resource 125 based on the request identifier that is included with the access control messaging.

ACU 130 may then determine, based on credentials, tokens, and/or other information provided with the access control messaging, that user device 110-2 or user 115-2 associated with user device 110-2 is authorized to access secured resource 125. Accordingly, ACU 130 may provide (at 260) access to secured resource 125 in response to the first arriving access control messaging that user device 110-2 sends over the third wireless network.

Contemporaneously, user device 110-1 may establish (at 265) a secure connection with system device 120 over the first wireless network, and may send (at 270) access control messaging with the request identifier received from system device 120 to system device 120. System device 120 may perform a local authorization, or, as shown in FIG. 2, may forward (at 275) the access control messaging to ACU 130 over a back-haul connection to ACU 130.

ACU 130 may detect that the request identifier in the access control messaging from user device 110-1 is valid, and may further detect that the same request identifier was already used to provide (at 260) access to secured resource 125. ACU 130 may prevent a second or later use of a request identifier after a first use or earlier use of the same request identifier resulted in access being granted. Accordingly, ACU 130 may discard (at 280) the access request and/or access control messaging that user device 110-1 originates over the first wireless network. ACU 130 may log the access request from user device 110-1 if user device 110-1 is authorized and/or is not authorized for access to secured resource 125.

ACU 130 may similarly receive and discard (at 285) the later arriving access control messaging that user device 110-2 originates using the second secure connection established over the second wireless network, and using the first secure connection established over the first wireless network when the later arriving access control messaging includes the request identifier that has already been used to provide (at 260) access to secured resource 125. ACU 130 may also receive and discard (at 290) other later arriving authorization messaging with the same request identifier that user device 110-1 originates using the third wireless network.

The detection of the same request identifier allows ACU 130 to provide access to secured resource 125 based on the earliest arriving access control messaging provided by an authorized user device 110 or authorized user 115, regardless of the wireless network used to transmit the access control messaging, the different hops traversed by the duplicative sets of access control messaging, and/or different user devices 110 originating the access control messaging for requesting access to the same secured resource 125 in response to the same triggering identifier or event (e.g., system device 120 detecting (at 210) the user touch). Moreover, detecting the duplicative request identifiers prevents ACU 130 from repeatedly locking and/or unlocking access to secured resource 125 in a short period of time, or exhibiting other undesirable operation.

Nevertheless, the access control system may provide authorized users access to secured resource 125 based on whatever timing is best for the authorized users. If access control messaging leads to an unlocking of a door (e.g., secured resource 125), and the door is relocked after five seconds without user 115 passing through, then ACU 130 may provide the same user 115 with access to the same door in response to the user reinitiating the secure handsfree proximity-based access control by touching or otherwise interacting with system device 120 (and without the user touching or otherwise interacting with his/her user device 110). Similarly, if authorization messaging from first user 115-1 leads to an unlocking of the door, and the door is relocked before second user 115-2 passes through, ACU 130 may provide second user 115-2 with access to the same door in response to second user 115-2 reinitiating the secure handsfree proximity-based access control by touching or otherwise interacting with system device 120, and second user 115-2 being authorized to access the door. In some embodiments, system device 120 may reinitiate the secure handsfree proximity-based access control based on time, a sensor detecting when secured resource 125 is accessed after access is provided, and/or other inputs besides the user interactions with system device 120.

Figure 3:
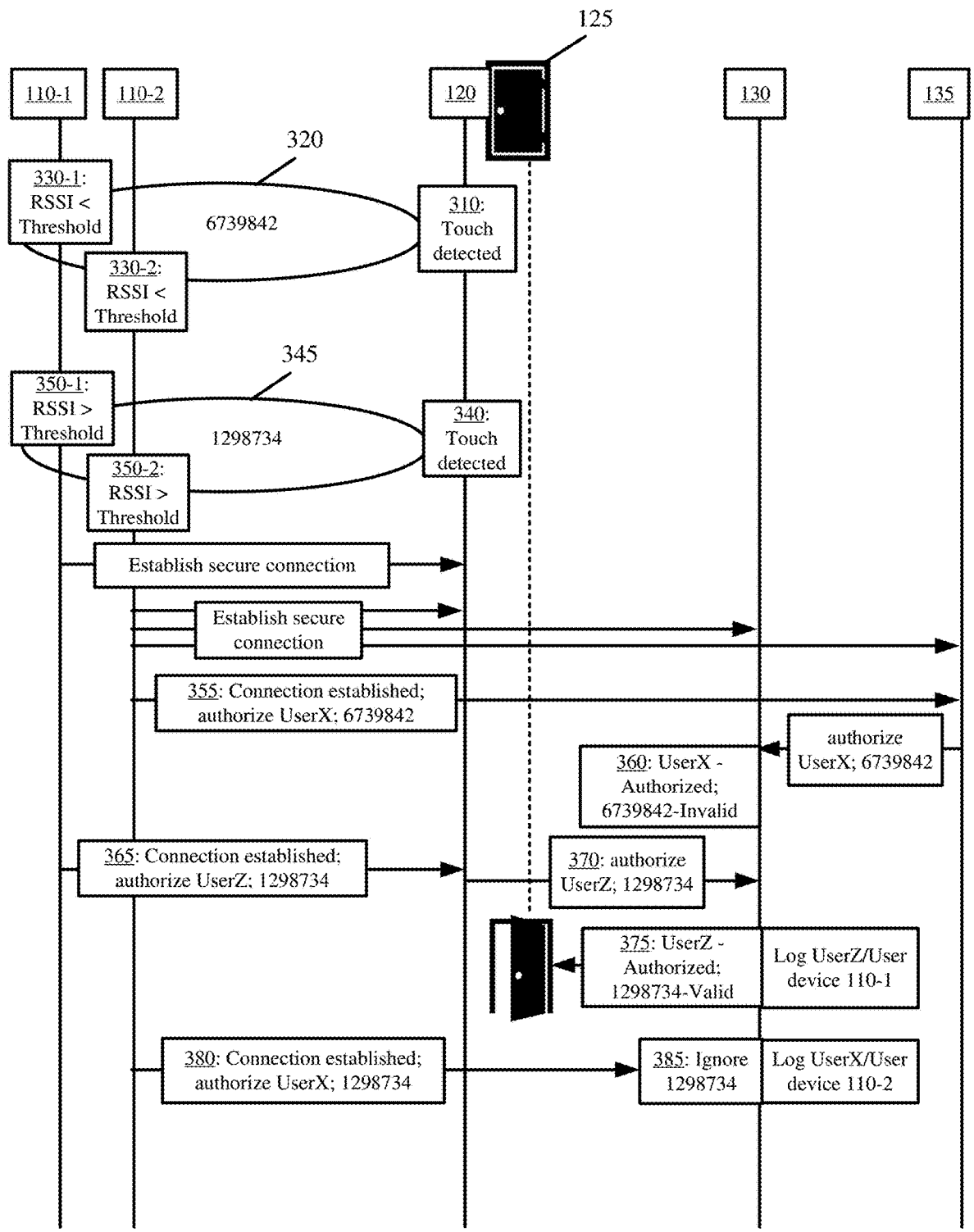
FIG. 3 illustrates an example of reinitiating the secure handsfree proximity-based access control in accordance with some embodiments described herein.

System device 120 may change the request identifier that system device 120 advertises over the first wireless network whenever the secure handsfree proximity-based access control is initiated or reinitiated. FIG. 3 illustrates an example of reinitiating the secure handsfree proximity-based access control in accordance with some embodiments described herein.

The secure handsfree proximity-based access control is initiated at a first time in response to system device 120 detecting (at 310) a user touch, gesture, or other interaction with system device 120. In response to detecting (at 310) the triggering event (e.g., user touch, gesture, or other interaction), system device 120 may generate and broadcast (at 320) a first request identifier with a first unique value.

User devices 110-1 and 110-2 may be in range of the first wireless network that system device 120 uses to broadcast the first request identifier. User devices 110-1 and 110-2 may receive the first request identifier, may obtain a signal strength measurement, and may determine (at 330-1 and 330-2) that the signal strength does not satisfy the signal strength threshold for commencing the authorization procedure to request access to secured resources 125. For instance, an unauthorized user or guest may initiate the secure handsfree proximity-based access control by issuing the touch to system device 120, and may be denied access to secured resource 125. Nevertheless, user devices 110 may temporarily store the first request identifier in case user devices 110 are brought closer to system device 120, and the signal strength increases past the signal strength threshold.

As shown in FIG. 3, the secure handsfree proximity-based access control is reinitiated at a later second time in response to system device 120 detecting (at 340) a second user touch, gesture, or other interaction with system device 120. In response to reinitiating the secure handsfree proximity-based access control, system device 120 may generate and broadcast (at 345) a different second request identifier with a second unique value.

In some embodiments, system device 120 may periodically generate a new request identifier, but may withhold broadcasting that request identifier until the touch, gesture, or other interaction is detected that initiates the secure handsfree proximity-based access control. ACU 130 may execute the same request identifier execution routine, may seed the routine with the same value, and may have a synchronized clock with system device 120 so as to internally generate request identifiers that match the request identifiers being generated by system device 120. In some embodiments, ACU 130 may create matching request identifiers for a plurality of different system devices 120 in order to authorize access to different secured resources 125 associated with each system device 120 of the plurality of system devices 120.

In some embodiments, the second request identifier and the first request identifier may have a first portion with a common value that directly or indirectly identifies secured resource 125 and/or system device 120. The second request identifier and the first request identifier may also have a second portion with different values for differentiating valid request identifiers for requesting access to secured resource 125 from invalid request identifiers. The second request identifier may also provide a new name for the wireless network generated by system device 120, or may provide a new name for user devices 110 to connect with system device 120 via the first wireless network.

User devices 110-1 and 110-2 may receive the second request identifier, may measure the signal strength of the first wireless network, and may determine (at 350-1 and 350-2) that the signal strength does satisfy the signal strength threshold. In response to the signal strength satisfying the signal strength threshold, each user device 110 may establish one or more secure network connections (e.g., a TLS encrypted network connection) via one or more wireless networks, and may commence the authorization procedure over each established secure network connection.

In response to user device 110-2 successfully establishing a secure connection with cloud-based controller 135, user device 110-2 may exchange (at 355) authorization messaging with the first request identifier using that secure connection. The exchange (at 355) with cloud-based controller 135 may occur before user device 110-2 exchanges authorization messaging using secure connections established over other wireless networks, and before user device 110-1 exchanges authorization messaging over any network connection.

ACU 130 may deny (at 360) user device 110-2, or associated user 115-2, access to secured resource 125 based on the authorization messaging for access to secured resource 125 including the first request identifier (e.g., an old request identifier), instead of the recently advertised second request identifier. In other words, user device 110-2, or associated user 115-2, may have sufficient privileges to access secured resource 125, but because the authorization is conducted using the invalid first request identifier, the authorization to access secured resource 125 is denied.

By periodically changing the request identifier, the access control system may prevent relay and/or other attacks that attempt to gain access to secured resource 125 with a user device 110 that is not in proximity to system device 120. For example, user device 110-2 may transmit the authorization messaging to cloud-based controller 135 or to ACU 130 over one or more long-range wireless networks without being in range of a short-range first wireless network that is created by system device 120, and that is used by system device 120 to advertise the valid and most recent request identifier to in-range user devices 110. Without being in range of the first wireless network created by system device 120, it may be difficult for a user device 110 to obtain the valid request identifier in order to complete the authorization procedure. In some embodiments, the request identifier advertised by system device 120 may remain valid for a short period of time (e.g., less than 5 seconds), after which the request identifier may not be used to authorize access.

As shown in FIG. 3, user device 110-1 may commence the authorization procedure to access secured resource 125 via the secure connection that is established with system device 120 over the first wireless network some short amount of time after user device 110-2 commenced the authorization procedure via the secure connection that was established with cloud-based controller 135 over the third wireless network. User device 110-1 may provide (at 365) authorization messaging with the second identifier to system device 120, and system device 120 may forward (at 370) the authorization messaging to ACU 130.

ACU 130 may determine that the second request identifier is valid, has not yet been used to grant access to secured resource 125, and may determine that user device 110-1 or associated user 115-1 is authorized to access secured resource 125. Accordingly, ACU 130 may provide (at 375) access to secured resource 125 as a result of the authorization messaging with the second request identifier that user device 110-1 originates over the first wireless network. ACU 130 may also log the request and/or access provided to user device 110-1.

After user device 110-2 is denied (at 360) access to secured resource 125, and after user device 110-1 is granted (at 375) access to secured resource 125, user device 110-2 may issue (at 380) another request to access secured resource 125 by providing authorization messaging with the second request identifier via a secure connection that is established with ACU 130 over the second wireless network. ACU 130 may determine that the second identifier is valid, but that the second identifier was previously used to obtain access to secured resource 125 by user device 110-1. Accordingly, ACU 130 may discard (at 385) the authorization messaging from user device 110-2, but may log that user device 110-2 was authorized for access to secured resource 125 using an already used request identifier.

In some embodiments, the signal strength threshold and/or other proximity threshold can be adjusted for increased security, and to limit the ability of unauthorized users from gaining access because of a nearby authorized user. For instance, the authorized user may gain access to secured resource 125 without intending to access the secured resource 125 because of his or her proximity to secured resource 125, and other unauthorized users may obtain access to secured resource 125 as a result. Similarly, the authorized user may gain access to secured resource 125, but may be far enough away from secured resource 125 that other closer unauthorized users access secured resource 125 before the authorized user. As a specific example, if the signal strength threshold is set at a value that equates to 10 feet of distance from system device 120 and/or secured resource 125, an unauthorized user standing next to secured resource 125 may initiate the secure handsfree proximity-based access control by interacting with the system device 120, and may gain access based on an authorized user that may be passing 10 feet in front of system device 120. By reducing the signal strength threshold to a value that equates to 2 feet of distance or less from system device 120 and/or secured resource 125, the likelihood of the unauthorized user gaining access without the authorized user's knowledge is minimized. Reducing the signal strength threshold and/or other proximity threshold can therefore be used to verify the intent of whether an authorized user intends to access secured resource 125, or simply passes before secured resource 125 without any intent of accessing secured resource 125.

Rather than rely strictly on the signal strength measurements of user devices 110 for triggering the authorization procedure, some embodiments may adjust the range of the first wireless network that is used to advertise the different request identifiers. For instance, system device 120 may adjust the power that is provided to the first wireless network radio to control the range of the first wireless network over which the request identifiers are disseminated.

Figure 4:
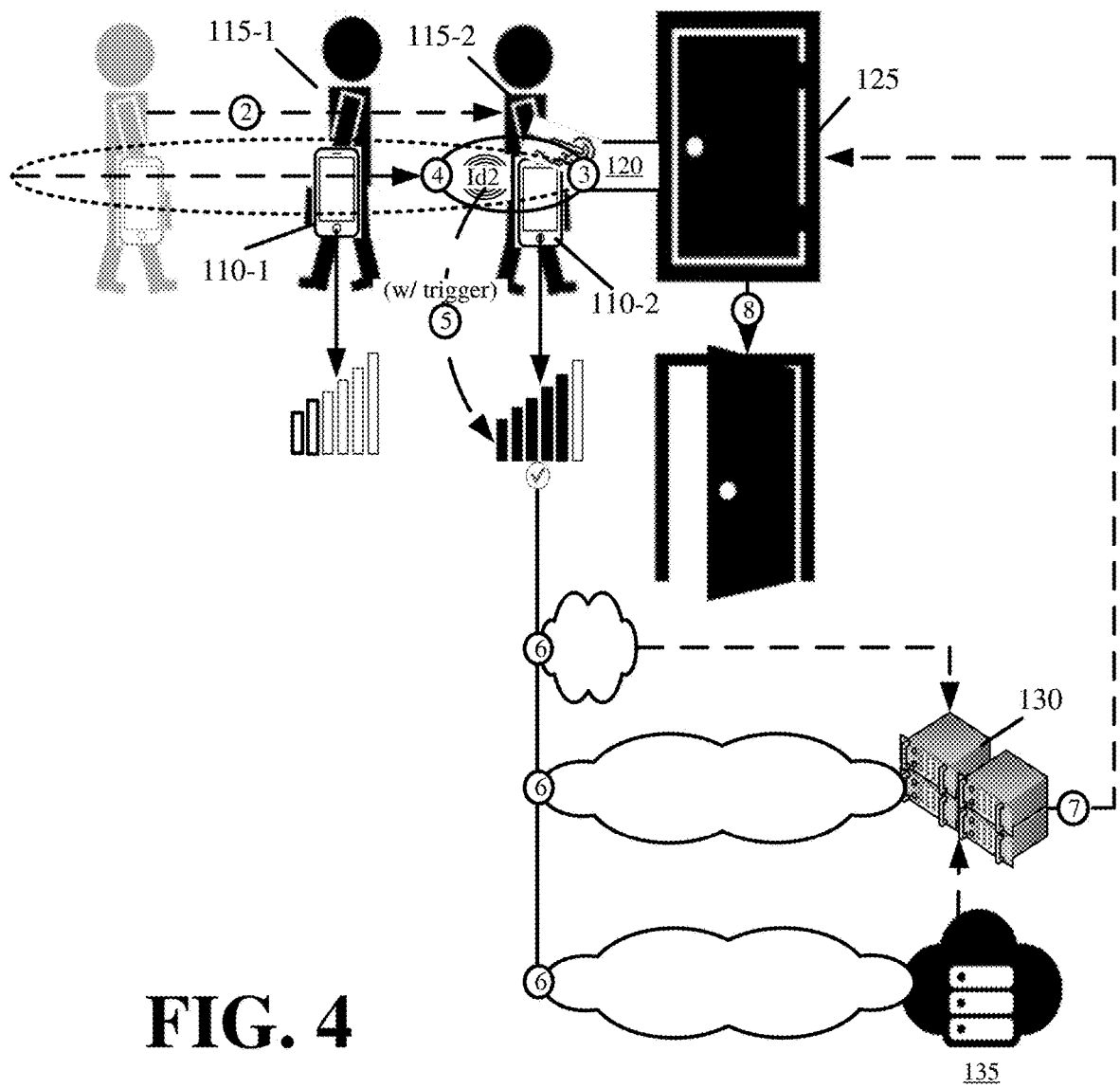
FIG. 4 illustrates an example of increasing security by adjusting the broadcasting range of the requested identifiers upon initiation of the secure handsfree proximity-based access control in accordance with some embodiments described herein.

FIG. 4 illustrates an example of increasing security by adjusting the broadcasting range of the request identifiers upon initiation of the secure handsfree proximity-based access control in accordance with some embodiments described herein. As shown in FIG. 4, system device 120 may initially allocate a first amount of power to a radio antenna with which system device 120 produces signaling for a first wireless network. The first amount of power causes the first wireless network to reach a first distance from system device 120, and user devices 110 that are the first distance from system device 120 may receive signaling that is transmitted by system device 120.

System device 120 may transmit (at 1) a first identifier the first distance 410 via the radio antenna operating at the first amount of power. The first identifier may identify system device 120 and secured resource 125 to in-range user devices 110. User devices 110 may perform an alternative unlocking procedure or different authorization procedure that is unrelated to the secure handsfree proximity-based access control when the signal strength measure does not satisfy the signal strength threshold or because the first identifier is not a trigger for the secure handsfree proximity-based access control.

Figure 5:
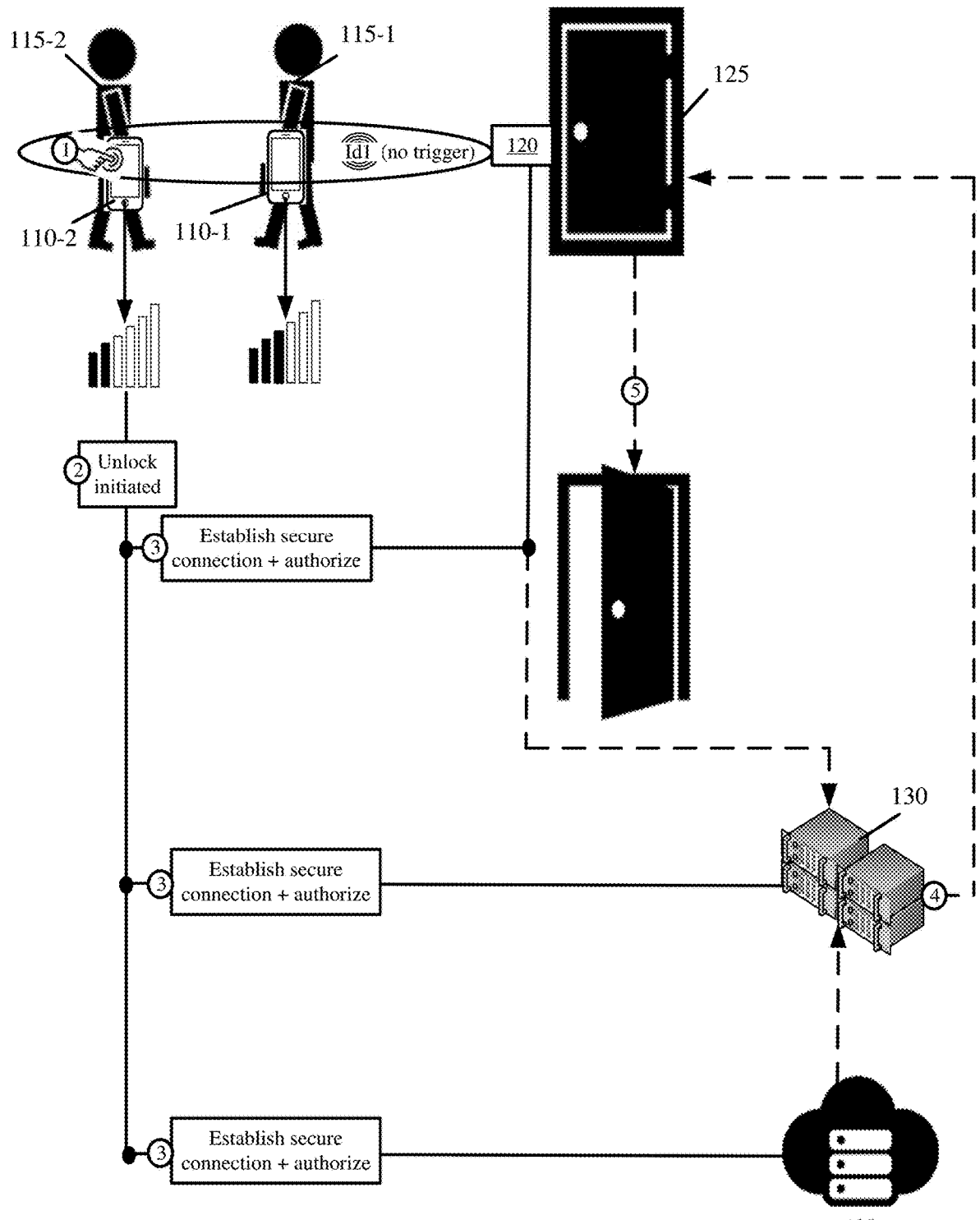
FIG. 5 illustrates a user initiating an authorization and/or unlock procedure from the edge of the first wireless network by directly interacting with a user device.

For instance, FIG. 5 illustrates user 115-2 initiating an authorization and/or unlock procedure from the edge of the first wireless network by directly interacting (at 1) with user device 110-2 rather than based on a signal strength measure or providing input (e.g., touching) to system device 120. As shown in FIG. 5, user device 110-2 may initiate (at 2) the authorization and/or unlock procedure in response to detecting the user input. User device 110-2 may establish (at 3) a secure connection with different authorization endpoints over different wireless networks, and may send (at 3) authorization messaging over each established connection to request access to secured resource 125. If authorized (at 4), ACU 130 may provide (at 5) user 115-2 with access to secured resource 125.

With reference back to FIG. 4, user 115-2 may approach (at 2) system device 120, and may initiate the secure handsfree proximity-based access control by touching (at 3) or otherwise interacting with system device 120 from a close distance. In response to the input from user 115-2, system device 120 may reduce the amount of power that is used to power the radio antenna so that the range of the first wireless network decreases (at 4) from the first distance to a shorter second distance from system device 120. For instance, the range of the first wireless network may decrease from the maximum range that is supported by Bluetooth (e.g., 30 feet), to a range that is less than 5 feet from system device 120. In addition to reducing (at 4) the first wireless network range, system device 120 may also generate a new second identifier as a request identifier for the secure handsfree proximity-based access control, and may advertise the second identifier (e.g., request identifier) over the reduced-range first wireless network.

Due to the reduced range of the first wireless network, user device 110-2 may receive the second identifier, but user device 110-1 may now be out of range of the first wireless network. Accordingly, user device 110-1 may not receive the second identifier, and may not trigger or commence the authorization procedure of the secure handsfree proximity-based access control as a result. Conversely, user device 110-2 may receive the second identifier, may determine that the second identifier is a trigger for initiating the secure handsfree proximity-based access control, and/or may determine (at 5) that the signal strength measurement for the first wireless network satisfies the signal strength threshold for commencing the authorization procedure of the secure handsfree proximity-based access control. Accordingly, user device 110-2 may establish (at 6) a secure connection, and may transmit the second identifier along with authorization credentials, tokens, and/or other information over one or more wireless networks.

The access control messaging may be routed to ACU 130. ACU 130 may authenticate (at 7) user 115-2 or user device 110-2 upon receiving the second identifier and the authentication credentials over whichever network path is fastest. ACU 130 may then provide (at 8) user 115-2 access to secured resource 125.

As a result of reducing (at 4) the range of the first wireless network when initiating the secure handsfree proximity-based access control, system device 120 and/or ACU 130 may ensure that authorized user 115-2 has the intent to access secured resource 125, and does so without another unauthorized user gaining access before user 115-2.

The secure handsfree proximity-based access control can be adapted for other use cases that provide greater security and/or greater convenience depending on the needs of the customer or user. In some embodiments, the secure handsfree proximity-based access control may be initiated without a user touch or other interaction with system device 120.

Figure 6:
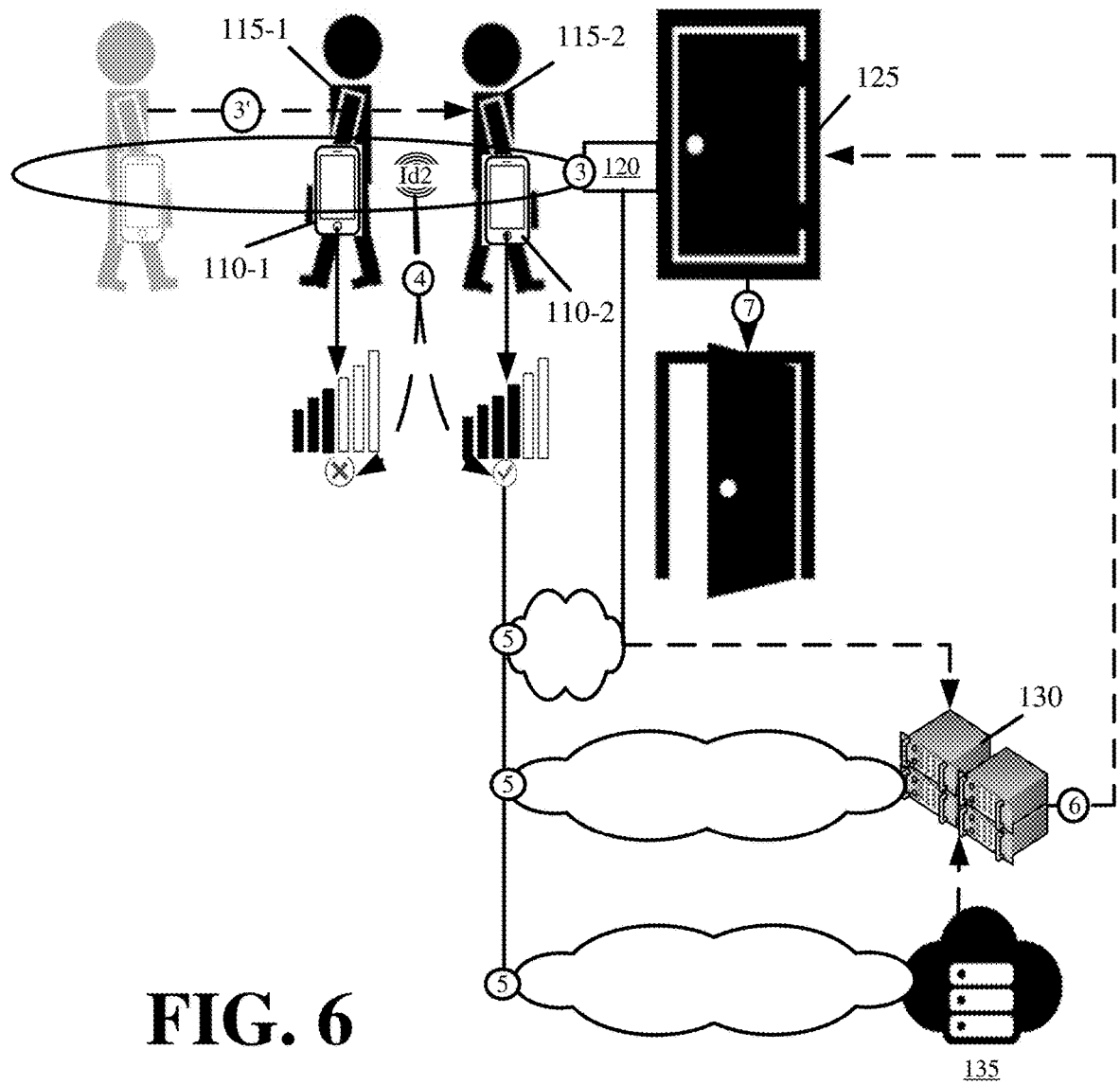
FIG. 6 illustrates an example of the secure handsfree proximity-based access control initiating and completing without any user interactions with a user device or a system device in accordance with some embodiments described herein.

FIG. 6 illustrates an example of the secure handsfree proximity-based access control initiating and completing without any user interactions with user devices 110 or system device 120 in accordance with some embodiments described herein. The operations and/or procedures illustrated in FIG. 6 mirror those depicted in the earlier figures but for initiating the secure handsfree proximity-based access control with a user touch or other interaction with system device 120. Instead, system device 120 may continuously broadcast a changing request identifier over the first wireless network that is created by system device 120.

As shown in FIG. 6, system device 120 initially broadcasts (at 1) a first request identifier over the first wireless network. User devices 110-1 and 110-2 receive the first request identifier, and determine (at 2) that the signal strength measurement does not satisfy the signal strength threshold. Consequently, neither user device 110 performs any further action with respect to the secure handsfree proximity-based access control.

After some passage of time, system device 120 automatically generates and broadcasts (at 3) a different second request identifier instead of the first request identifier. For instance, system device 120 may broadcast a new request identifier every 5 or 10 seconds. The request identifier may directly or indirectly identify system device 120 and/or secured resource 125, and may provide a unique value or changing value for differentiating a current valid request identifier from invalid request identifiers associated with the same system device 120 and/or secured resource 125.

User 115-2 is illustrated to have moved (at 3') closer to system device 120 when the second request identifier is broadcast (at 3). User device 110-1 of user 115-1, and user device 110-2 of user 115-2 both receive the second request identifier. The signal strength measurement obtained by user device 110-1 still does not satisfy (at 4) the signal strength threshold. However, the signal strength measurement obtained by user device 110-2 does satisfy (at 4) the signal strength threshold. Accordingly, user device 110-2 commences the authorization procedure of the secure handsfree proximity-based access control over one or more wireless networks with the second request identifier. The authrozation procedure may include user device 110-2 establishing (at 5) a secure network connection with one or more authorization endpoints (e.g., system device 120, ACU 130, and cloud-based controller 135) over one or more wireless networks, and exchanging (at 5) access control messaging with the second request identifier over the different network connections in order to request and authorize access to secured resource 125.

In response to the earliest access control messaging originated by user device 110-2, ACU 130 may determine (at 6) that the second request identifier included with the access control messaging is valid, the second request identifier has not been previously used to gain access to secured resource 125, and may determine that user 115-2 or user device 110-2 is authorized to access secured resource 125. Accordingly, ACU 130 may provide (at 7) access to secured resource 125.

Figure 7A:
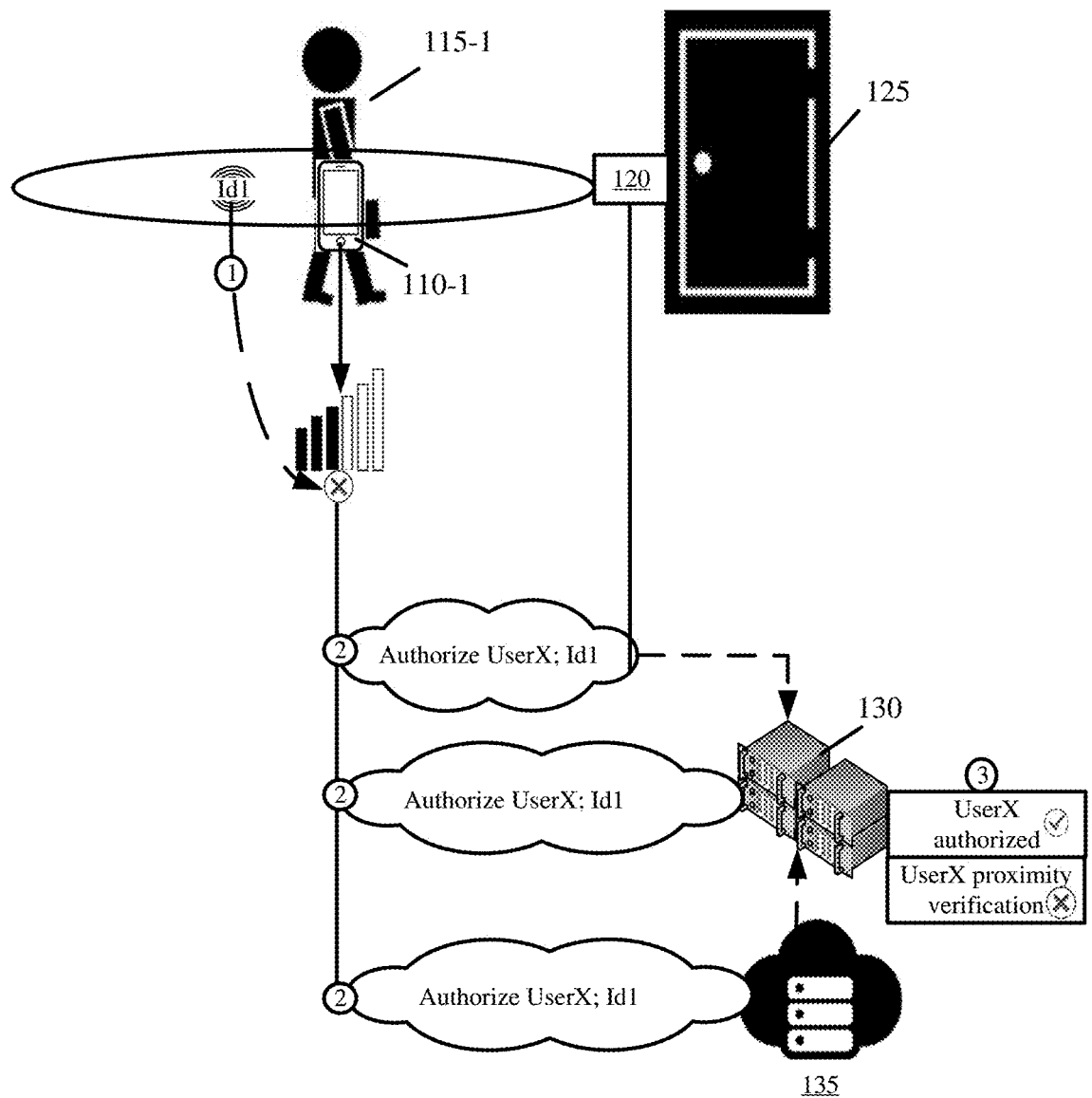
FIGS. 7A and 7B illustrate a two-stage implementation of the secure handsfree proximity-based access control in accordance with some embodiments described herein.
Figure 7B:
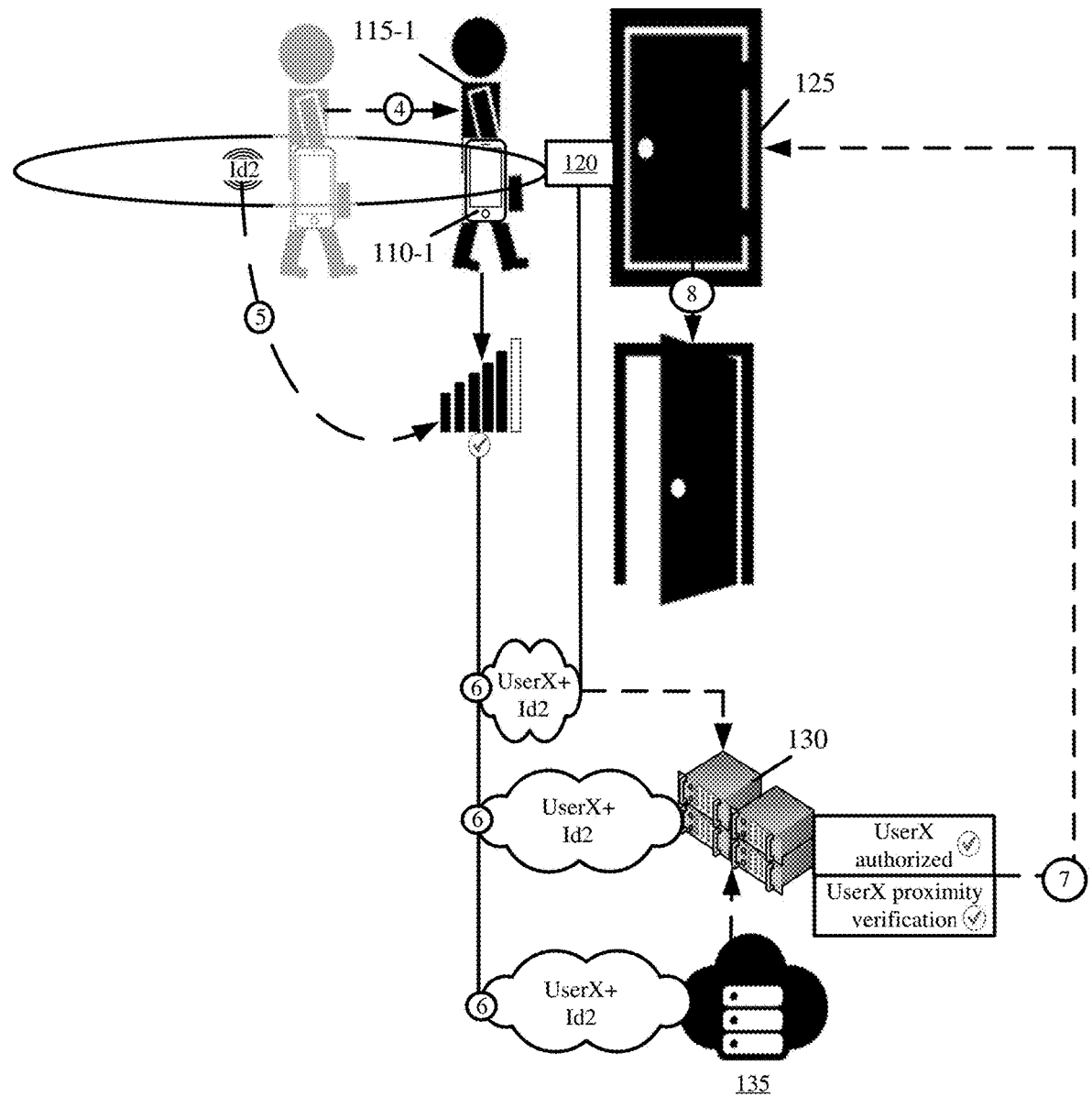

FIGS. 7A and 7B illustrate a two-stage implementation of the secure handsfree proximity-based access control in accordance with some embodiments described herein. FIG. 7A illustrates user 115-1 that is a first distance from system device 120 and/or secured resource 125. User device 110-1, that is carried by user 115-1, receives a first request identifier that is advertised from system device 120 over the first wireless network generated by system device 120. User device 110-1 may obtain (at 1) a signal strength measure upon receiving the first request identifier, may determine that the signal strength does not satisfy the signal strength threshold.

In response to the first request identifier and the signal strength not satisfying the signal strength threshold, user device 110-1, via the access control application running thereon, may commence a first part of the two-stage secure handsfree proximity-based access control over one or more wireless networks. In particular, user device 110-1 may establish (at 2) secure network connections with different authorization endpoints over different wireless networks, and may submit (at 2) authorization messaging over the established connections to preauthorize access to secured resource 125.

In response to the earliest arriving authorization messaging from user device 110-1, ACU 130 may determine (at 3) that user 115-1 or user device 110-1 is authorized to access secured resource, and may log the authorization status. ACU 130 may also determine that the proximity of user 110-1 to system device 120 and/or secured resource 125 has not been verified, because the authorization messaging from user device 110-1 may include a flag that indicates user device 110-1 has not satisfied the signal strength threshold.

Although user device 110-1 is authorized to access secured resource 125, access is not yet provided. However, user device 110-1 has already established the secure network connections, and exchanged the authorization messaging such that user 115-1 does not have to wait for these operations to complete when user 115-1 is closer to secured resource 125 and is ready to access secured resource 125.

As shown in FIG. 7B, user 115-1 moves (at 4) closer to system device 120, and user device 110-1 receives a second request identifier from system device 120. At the closer location, user device 110-1 may determine (at 5) that the signal strength threshold has been satisfied, and user device 110-1 sends (at 6) an access confirmation message with the second request identifier over the one or more wireless networks using the already established secure network connections. The access confirmation message may be different than the authorization messaging previously sent, and may be used to complete a second part of the two-stage secure handsfree proximity-based access control.

In response to receiving the second request identifier from user device 110-1, ACU 130 may detect that user 115-1 and/or user device 110-1 has already been authorized to access secured resource 125, and the second request identifier or a flag in the submitted messaging confirms (at 7) the proximity of user 115-1 to system device 120. Accordingly, ACU 130 may issue (at 7) messaging to provide (at 8) user 115-1 with access to secured resource 125.

In some embodiments, the second request identifier may trigger sending of the access confirmation message from any user devices 110 that have already completed the authorization procedure (e.g., first part of the two-stage procedure), and that measure signal strength at or beyond the signal strength threshold. In some such embodiments, system device 120 may transmit the second request identifier for trigging the second part of the two-stage procedure in response to a user 115 touching or otherwise providing input directly to system device 120.

Figure 8:
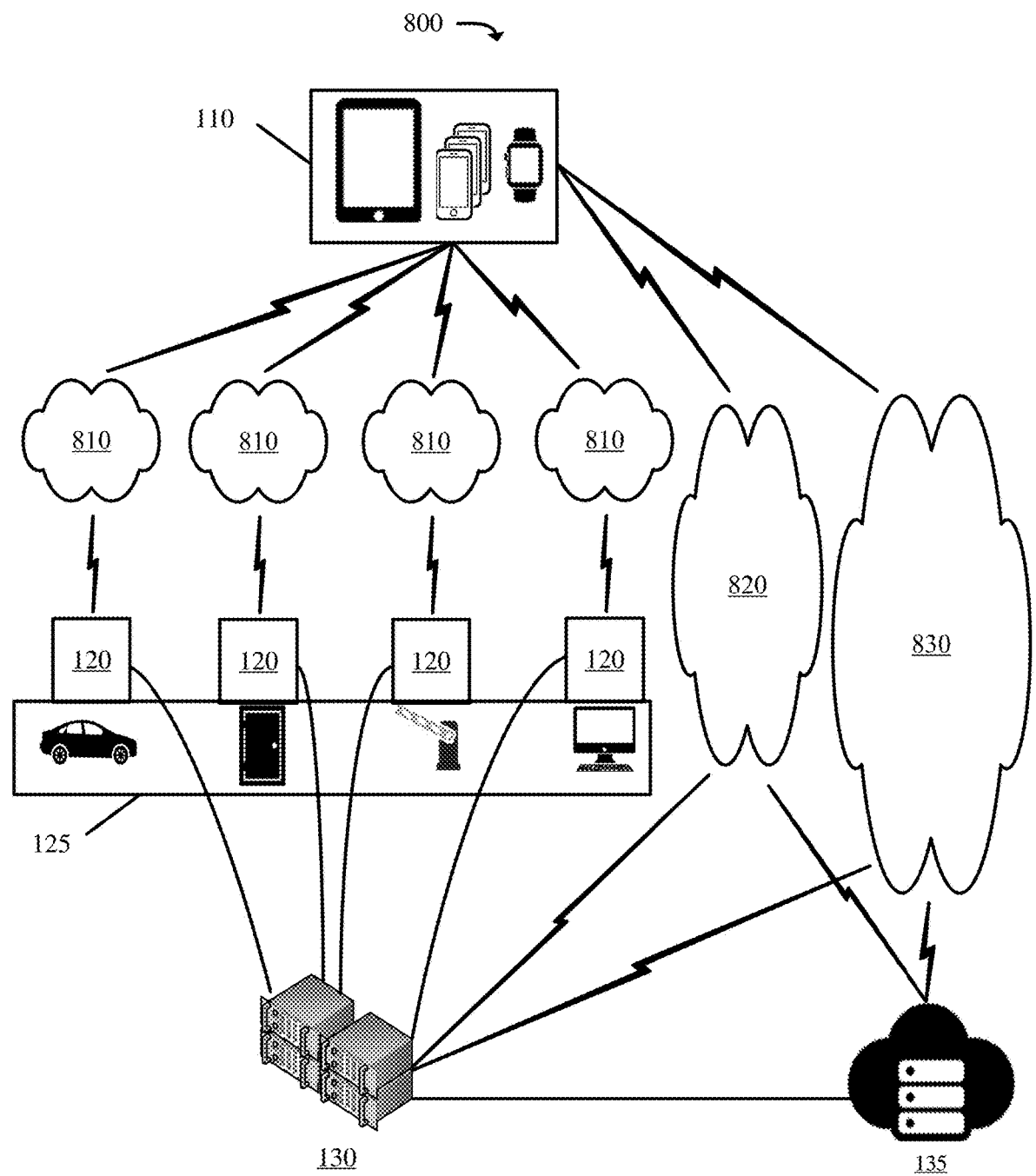
FIG. 8 illustrates an example environment in which one or more embodiments, described herein, may be implemented.

FIG. 8 illustrates an example environment 800 in which one or more embodiments, described herein, may be implemented. As shown in FIG. 8, environment 800 may include user devices 110, system devices 120, secured resources 125, ACU 130, cloud-based controller 135, first wireless network 810, second wireless network 820, and third wireless network 830.

The quantity of devices, components, and/or networks, illustrated in FIG. 8, is provided for explanatory purposes only. In practice, environment 800 may include additional devices, components, and/or networks; fewer devices, components, and/or networks; different devices, components, and/or networks; or differently arranged devices, components, and/or networks than illustrated in FIG. 8. One or more of the devices of environment 800 may perform one or more functions described as being performed by another one or more of the devices of environment 800. For instance, ACU 130 functionality may be integrated in a distributed fashion within each system device 120, such that each system device 120 may locally authorize a user 115 or user device 110 for access to a secured resource 125. Alternatively, functionality of ACU 130 may be integrated as part of functionality of cloud-based controller 135 and vice versa. Devices of environment 800 may interconnect with each other and/or other devices via wired connections, wireless connections, or a combination of wired and wireless connections. In some implementations, one or more devices of environment 800 may be physically integrated in, and/or may be physically attached to, one or more other devices of environment 800. For instance, ACU 130 may be implemented on one or more instances of cloud-based controller 135.

User devices 110 may include any battery-operated device that can be carried by users 115, and that includes at least one wireless radio for wireless communication over at least one of wireless networks 810, 820, and 830. For instance, user devices 110 may include one or more radios for wirelessly communicating using Near Field Communication ("NFC"), Bluetooth, WiFi, LTE, Next Generation ("5G"), and/or other wireless networking technologies. In some implementations, user devices 110 may be or may include a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smartphone, a laptop computer, a tablet computer, an Internet-of-Things ("IoT") device, a wearable device, and/or other portable battery operated device that can be carried in a pocket, in a purse, or on one's person.

User devices 110 may further include devices that have a processor, memory, and storage, and that execute an operating system ("OS") and/or the access control application that performs the user device-side execution of the secure handsfree proximity-based access control. The access control application and other applications may run atop the OS, and may be managed by the OS. For instance, the OS may allocate processing, memory, and/or other resources to running applications, and may further manage power of the mobile device by closing applications based on various power management policies and/or other criteria. The OS may obtain signal strength measures of any wireless network that can be detected using the one or more wireless radios. The OS may also provide a beaconing service that may trigger different application execution, and/or may pass different identifiers to different applications in response to receiving the request identifiers, broadcasts, and/or other advertisements from system devices 120 and other transmitting devices or beacons. The access control application, that performs the user device-side execution of the secure handsfree proximity-based access control, may register a particular format of the request identifiers broadcast by system devices 120 with the OS. Upon detecting a request identifier in the particular format, the OS may then forward that request identifier to the access control application, and/or may wake the access control application from a sleep, closed, background, or other non-executing state. In some embodiments, the configuration of the access control application may be changed programmatically via over-the-air updates.

System devices 120, ACU 130, and/or cloud-based controller 140 may be part of the same access control system. The access control system may regulate user access to secured resources 125. Each system device 120 may be attached to or located near a different secured resource 125.

Each particular system device 120 may include at least one wireless radio for generating first wireless network 810, for broadcasting the request identifiers across first wireless network 810, and/or for exchanging access control messaging with a connected user device 110 in range of first wireless network 810 created by that particular system device 120. As noted above, power to the wireless radio can be dynamically adjusted in order to modify the range of first wireless network 810 that is created by that particular system device 120. In some embodiments, system device 120 generates or transmits messaging using a short-range wireless network such as Bluetooth.

System devices 120 may also include a speaker and/or other components to transmit different signaling (e.g., ultrasonic sound waves, magnetic fields, etc.) with which user devices 110 may alternatively obtain a signal strength measurement for proximity verification purposes. System devices 120 may include one or more sensors for detecting user touches, gestures, and/or other interactions that can be used to initiate the secure handsfree proximity-based access control or authorization procedures thereof. In some embodiments, system devices 120 may include other sensors, transmitters, and/or receivers that allow system devices 120 to operate as traditional access control readers. For instance, system devices 120 may generate magnetic fields or provide other signaling to communicate with a nearby proximity card or smartcard.

Each system device 120 may include a processor and memory that execute a request identifier generation routine to produce the changing and unique request identifiers. Each system device 120 may also include a back-haul network connection to ACU 130. The back-haul network connection may be a wired or wireless network connection, and may use either second wireless network 820 or third wireless network 830 to communicate with ACU 130 in some embodiments.

In some embodiments, ACU 130 may be located on a customer site, and may control access to several secured resources 125 at the customer site. In some other embodiments, ACU 130 may be remote from the customer site.

ACU 130 may be accessible via an IP or other network address that is configured in the access control application running on user devices 110. ACU 130 may store access privileges that different users 115 or user devices 110 have to different secured resources 125. ACU 130 may store conditional access privileges that limit certain users 115 to accessing certain secured resources 125 at different times of day or in response to different events or conditions.

ACU 130 may include a processor, memory, and network interface to receive access control messaging from user devices 110, and to determine which user devices 110 should be granted access to a requested secured resource 125, and which should be denied access. ACU 130 may receive the access control messaging directly from user devices 110 over the second and/or third networks 820 and 830, and/or indirectly from system devices 120 and cloud-based controller 135 when user devices 110 send duplicative or original access control messaging to these devices over the different wireless networks 810, 820, and 830.

ACU 130 may also have a network or signaling interface to secured resources 125 in order to control secured resources 125. For instance, ACU 130 may send commands or signaling that cause secured resources 125 to provide or grant access to certain users. This may include sending lock and unlock commands to an electronic lock on a door of a secured resource 125. In some embodiments, each system device 120 may be used to control access to an adjacent secured resource 125. In some such embodiments, ACU 130 may send control signaling to a particular system device 120, and the particular system device 120 may control access to a particular secured resource 125 based on the control signaling.

Secured resources 125 may include any physical or digital asset that can be remotely locked and unlocked, closed and opened, or otherwise made inaccessible and accessible. In some embodiments, secured resources 125 may include doors, windows, gates, or other physical barriers with a controllable locking or closing mechanism. In some embodiments, secured resources 125 may be a computer, vehicle, or other system with restricted access. Each secured resource 125 may have a network or signaling interface with which secured resource 125 may be remotely controlled by ACU 130 or adjacent system devices 120.

Cloud-based controller 135 may include an administrative device of the access control system. Cloud-based controller 135 may be accessed via an IP address or other network address using any Internet-enabled device. Cloud-based controller 135 may be used to configure or administer control over one or more customer ACUs 130. For instance, a customer may have three office locations, and each office location may have an ACU 130 to control access to secured resources 125 at that office location. The customer may access cloud-based controller 135 to configure or control their ACUs 130. In some embodiments, cloud-based controller 135 may receive and forward access control messaging from user devices 110 to the ACU 130 that controls the secured resources 125 to which the access control messaging is directed.

In some embodiments, cloud-based controller 135 may supplement ACU 130. In some such embodiments, cloud-based controller 135 may receive the access control messaging over second or third wireless networks 820 and 830, may authorize user 115 or user device 110 access to secured resources 125 on behalf of or in place of ACU 130, and/or may provide authorized users with access to different secured resources 125 by directly controlling or signaling secured resources 125.

As noted above, first wireless network 810 may include a short-range wireless network that is created by each system device 120, and is used to broadcast the request identifier to in-range user devices 110. First wireless network 810 may include a Bluetooth, BLE, or other short-range wireless network.

Second and third wireless networks 820 and 830 may represent longer-range wireless networks that user devices 110 may use to reach any Internet-accessible device including ACU 130 and/or cloud-based controller 135. Second and third wireless networks 820 and 830 may include WiFi, LTE, 5G, any wireless telecommunications network, Internet Protocol-based packet data networks ("PDNs"), and/or wide area networks ("WANs") such as the Internet. For instance, user devices 110 may access second wireless network 820 via a WiFi wireless router, and may access third wireless network 830 via a Radio Access Network ("RAN") of a wireless telecommunications network.

Figure 9:
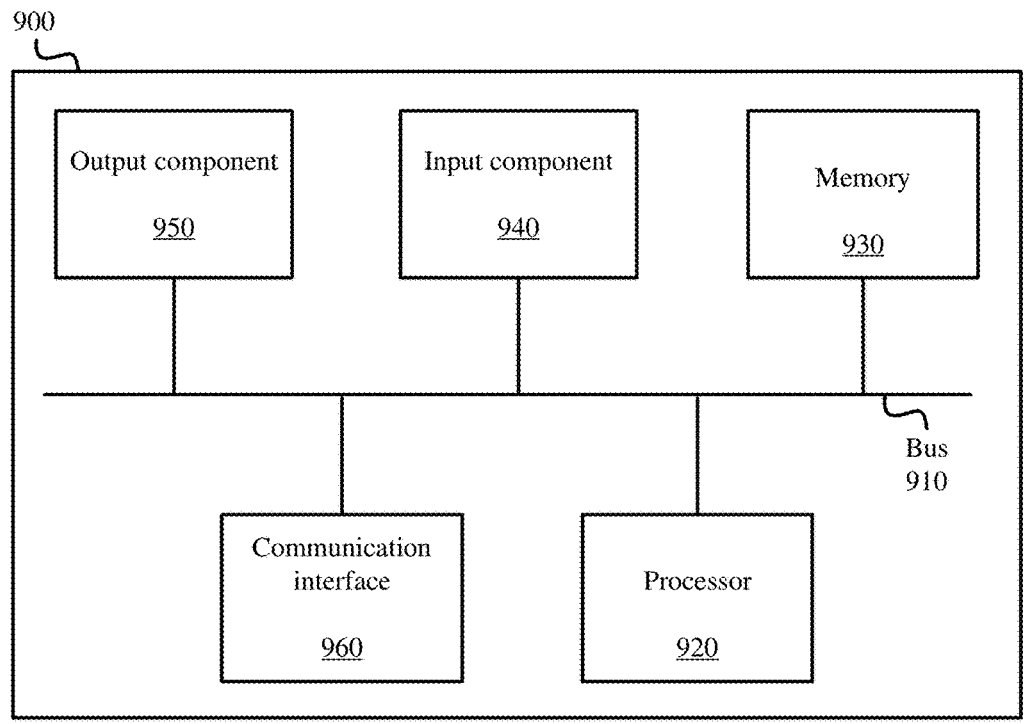
FIG. 9 illustrates example components of one or more devices, according to one or more embodiments described herein.

FIG. 9 is a diagram of example components of device 900. Device 900 may be used to implement user devices 110, system devices 120, ACU 130, cloud-based controller 135, and/or access controllers of secured resources 125. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
    receiving, at a user device, an identifier from a system device after the user device enters in range of a wireless network created by the system device;
    obtaining a signal strength measurement in response to said receiving;
    determining that the signal strength satisfies a signal strength threshold;
    providing the identifier as part of an authorization procedure to access a secured resource in response to said determining; and
    obtaining access to the secured resource in response to (i) the user device or an associated user of the user device being authorized to access the secured resource, (ii) the identifier matching to a most recent identifier broadcast from the system device, and (iii) the identifier not having been previously used to obtain access to the secured resource.

2. The method of claim 1 further comprising:
    establishing a first network connection with the system device over the wireless network created by the system device after said receiving and in response to initiating the authorization procedure upon determining that the signal strength satisfies the signal strength threshold.

3. The method of claim 2 further comprising:
    establishing a different second network connection with an access control unit over a different second wireless network contemporaneously with establishing the first network connection and further in response to initiating the authorization procedure upon determining that the signal strength satisfies the signal strength threshold.

4. The method of claim 3, wherein said providing comprises:
    transmitting a set of access control messaging with the identifier through the wireless network created by the system device via the first network connection; and
    transmitting a redundant set of access control messaging with the identifier through the second wireless network via the second network connection.

5. The method of claim 1 further comprising:
    receiving a different second identifier from the system device in response to a user directly interacting with the system device.

6. The method of claim 1, wherein said obtaining the signal strength measurement comprises:
    measuring a strength of signaling from the wireless network created by the system device.

7. The method of claim 1, wherein said providing comprises:
    exchanging access control messaging with the identifier over two or more wireless networks in parallel from the user device, wherein the two or more wireless networks comprise the wireless network created by the system device.

8. The method of claim 7, wherein the two or more wireless networks further comprise a Bluetooth network, a WiFi network, and a network of a wireless telecommunications service provider.

9. The method of claim 1, wherein said determining occurs at a first time when the user device is within a specified proximity of the system device, the method further comprising:
    determining that the signal strength does not satisfy the signal strength threshold at a second time when the user device is not within the specified proximity of the system device; and
    aborting the authorization procedure until the signal strength satisfies the signal strength threshold.

10. A method comprising:
    detecting a user interaction with a system device;
    advertising, in response to said detecting, a request identifier to a plurality of user devices that are in range of a wireless network created by the system device;
    triggering an authorization procedure on a subset of the plurality of user devices based on the request identifier and a signal strength of the wireless network to the subset of user devices satisfying a signal strength threshold;
    receiving a first identifier with a first request to access a secured resource from a first user device of the subset of user devices at a first time, before receiving a second identifier with a second request to access the secured resource from a second user device of the subset of user devices at a second time;
    authorizing access to the secured resource at the first time based on (i) the first identifier matching to the request identifier, and (ii) the request identifier not having been previously used to obtain access to the secured resource;
    authorizing access to the secured resource at the second time based on (i) the first user device or an associated first user of the first user device not being authorized to access the secured resource, (ii) the first identifier not matching to the request identifier, or (iii) the request identifier not having been previously used to obtain access to the secured resource; and providing access to the secured resource in response to earliest successful authorization occurring at the first time or the second time.

11. The method of claim 10 further comprising:
successfully authorizing access to the secured resource at the first time based on (i) the first user device or the associated first user of the first user device being authorized to access the secured resource, (ii) the first identifier matching to the request identifier, and (iii) the request identifier not having been previously used to obtain access to the secured resource; and
discarding the second request in response to the second identifier matching to the first identifier, and the first identifier being used at the first time to obtain access to the secured resource.

12. The method of claim 10 further comprising:
discarding the first request in response to the first identifier not matching to the request identifier;
successfully authorizing access to the secured resource at the second time based on (i) the second user device or an associated second user of the second user device being authorized to access the secured resource, (ii) the second identifier matching to the request identifier, and (iii) the request identifier not having been previously used to obtain access to the secured resource as a result of discarding the first request.

13. The method of claim 10, wherein the wireless network created by the system device is a first wireless network, and where said receiving comprises:
forwarding the first identifier and the first request from a first network connection created over the first wireless network to an access control unit; and
forwarding the second identifier and the second request from a second network connection created over a different second wireless network to the access control.

14. The method of claim 10, wherein said receiving further comprises:
receiving the first identifier with a redundant first request at a third time, wherein the first request originates over a first wireless network, and the redundant first request originates over a different second wireless network; and
discarding the redundant first request in response to successfully authorizing access at the first time based on the first request.

15. The method of claim 10 further comprising:
reducing a range of the wireless network by reducing power to a radio of the system device in response to said detecting and before said advertising.

16. The method of claim 10 further comprising:
detecting a second user interaction with the system device;
generating a different second request identifier in response to detecting the second user interaction; and
advertising the second request identifier to the plurality of user devices that are in range of the wireless network created by the system device.

17. An access control system controlling access to at least one secured resource, the access control system comprising:
a system device located adjacent to a secured resource, the system device comprising:
a radio that advertises a changing request identifier over a wireless network created by the system device;
an access control unit comprising:
a network interface receiving a first identifier with a first request to access the secured resource from a first user device at a first time, before receiving a second identifier with a second request to access the secured resource from a second user device of the subset of user devices at a second time;
one or more processors configured to:
authorize access to the secured resource at the first time based on (i) the first identifier matching to a current request identifier advertised from the system device, and (ii) the current request identifier not having been previously used to obtain access to the secured resource; and
authorize access to the secured resource at the second time based on (i) the first user device or an associated first user of the first user device not being authorized to access the secured resource, (ii) the first identifier not matching to the current request identifier, or (iii) the current request identifier not having been previously used to obtain access to the secured resource; and
provide access to the secured resource in response to earliest successful authorization occurring at the first time or the second time.

18. The access control system of claim 17, wherein the system device further comprises a sensor detecting a user interaction with the system device, and wherein the system device generates the current request identifier and advertises the current request identifier in response to the detecting the user interaction.

19. The access control system of claim 17 further comprising:
an access control application installed on the first user device, wherein the access control application uses one or more radios and processors of the first user device to:
receive the current request identifier;
obtain a signal strength measurement in response to said receiving;
determine that the signal strength satisfies a signal strength threshold; and
provide the first identifier and the first request via a first wireless network in response to determining that the signal strength satisfies the signal strength threshold.

20. The access control system of claim 17, wherein the access control application further uses one or more radios and processors of the first user device to:
provide the first identifier and a duplicate first request via a different second wireless network in response to determining that the signal strength satisfies the signal strength threshold.

* * * * *